United States Patent
Takami et al.

(10) Patent No.: US 7,404,523 B2
(45) Date of Patent: Jul. 29, 2008

(54) IC CARD WITH A CIPHER KEY CONVERSION FUNCTION

(75) Inventors: Yutaka Takami, Yokohama (JP);
Shinichiro Fukushima, Yokohama (JP);
Kazunori Hashimoto, Fujisawa (JP);
Makoto Aikawa, Sagamihara (JP);
Tetsuharu Inamitsu, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 299 days.

(21) Appl. No.: 10/834,245

(22) Filed: Apr. 29, 2004

(65) Prior Publication Data

US 2004/0256470 A1 Dec. 23, 2004

(30) Foreign Application Priority Data

May 20, 2003 (JP) .............................. 2003-141295

(51) Int. Cl.
*G06K 19/06* (2006.01)
(52) U.S. Cl. ...................................... 235/492; 235/487
(58) Field of Classification Search .................. 235/492, 235/487
See application file for complete search history.

(56) References Cited

U.S. PATENT DOCUMENTS

| 5,381,478 | A | * | 1/1995 | Iijima .......................... 380/44 |
| 5,745,571 | A | * | 4/1998 | Zuk .......................... 380/285 |
| 6,073,236 | A | | 6/2000 | Kusakabe et al. |
| 6,408,390 | B1 | | 6/2002 | Saito |

FOREIGN PATENT DOCUMENTS

| CN | 1180865 | 5/1998 |
| DE | 19925389 | 12/2000 |
| EP | 1 111 557 A2 | 6/2001 |
| EP | 1 117 064 A1 | 7/2001 |
| JP | A-2001-167241 | 6/2001 |

* cited by examiner

*Primary Examiner*—Lisa M Caputo
(74) *Attorney, Agent, or Firm*—Antonelli, Terry, Stout & Kraus, LLP.

(57) ABSTRACT

Information recorded by an application provider in an IC card can be referred to, read out or changed by another application provider. The IC card has a plurality of cipher keys for reading out or writing the information recorded in the IC card, and provides a cipher key conversion function for encryption with a file capable of being managed, read out or written by the application provider himself using the cipher key. By the cipher key conversion function, data can be read out or written from or in the file of the other application provider.

6 Claims, 19 Drawing Sheets

FIG.4A

ENCRYPTED DATA WRITE COMMAND

| CLA | INS | P1 | P2 | Lc | Le |
|-----|-----|----|----|----|----|
| x1  | x2  | x3 | x4 | x5 | x6 |

Lc Data

| TITLE | LENGTH | CONTENTS |
|-------|--------|----------|
| STORAGE DATA | nBytes | ENCRYPTED DATA TO BE STORED | x1:0x82
x2:0x02
x3:0x00
x4:0x00
x5:n=Lc length
x6:0x00=WITHOUT Le

FIG.4B

RESPONSE

WITHOUT Le Data

Status

| SW1 | SW2 |
|-----|-----|
| s1  | s2  | s1:SW1
s2:SW2
SW1=0x90,SW2=0x00 : NORMAL OPERATION

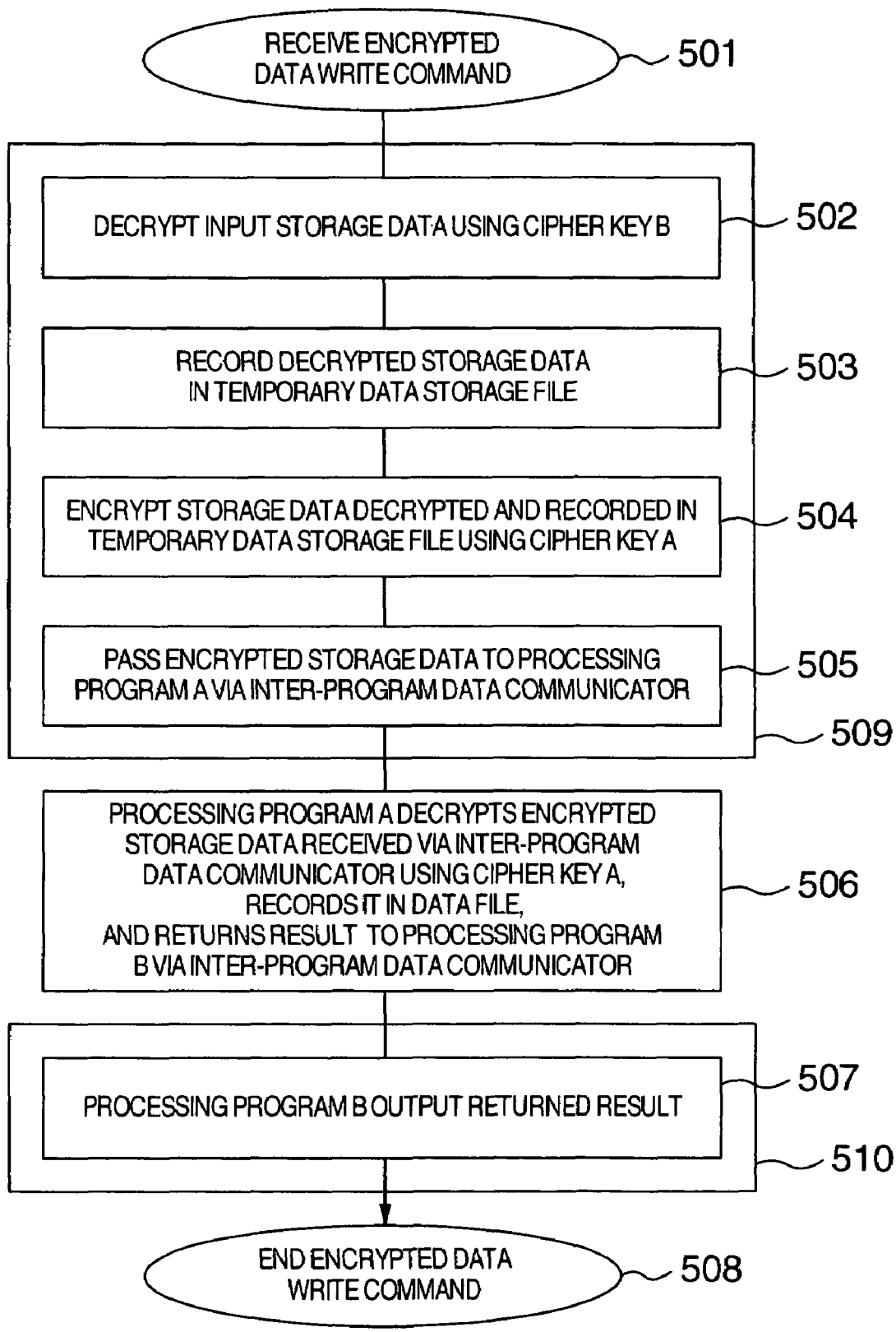

FIG.6A

ENCRYPTED DATA READ COMMAND

| CLA | INS | P1 | P2 | Lc | Le |
|-----|-----|----|----|----|-----|
| x1  | x2  | x3 | x4 | x5 | x6 |

WITHOUT Le Data x1:0x82
x2:0x04
x3:0x00
x4:0x00
x5:0x00= WITHOUT Lc
x6:n=Le length

FIG.6B

RESPONSE

Le Data

| TITLE | LENGTH | CONTENTS |
|-------|--------|----------|
| READ DATA | nBytes | READ ENCRYPTED DATA |

Status

| SW1 | SW2 |
|-----|-----|
| s1  | s2  | s1:SW1
s2:SW2
SW1=0x90, SW2=0x00 : NORMAL OPERATION

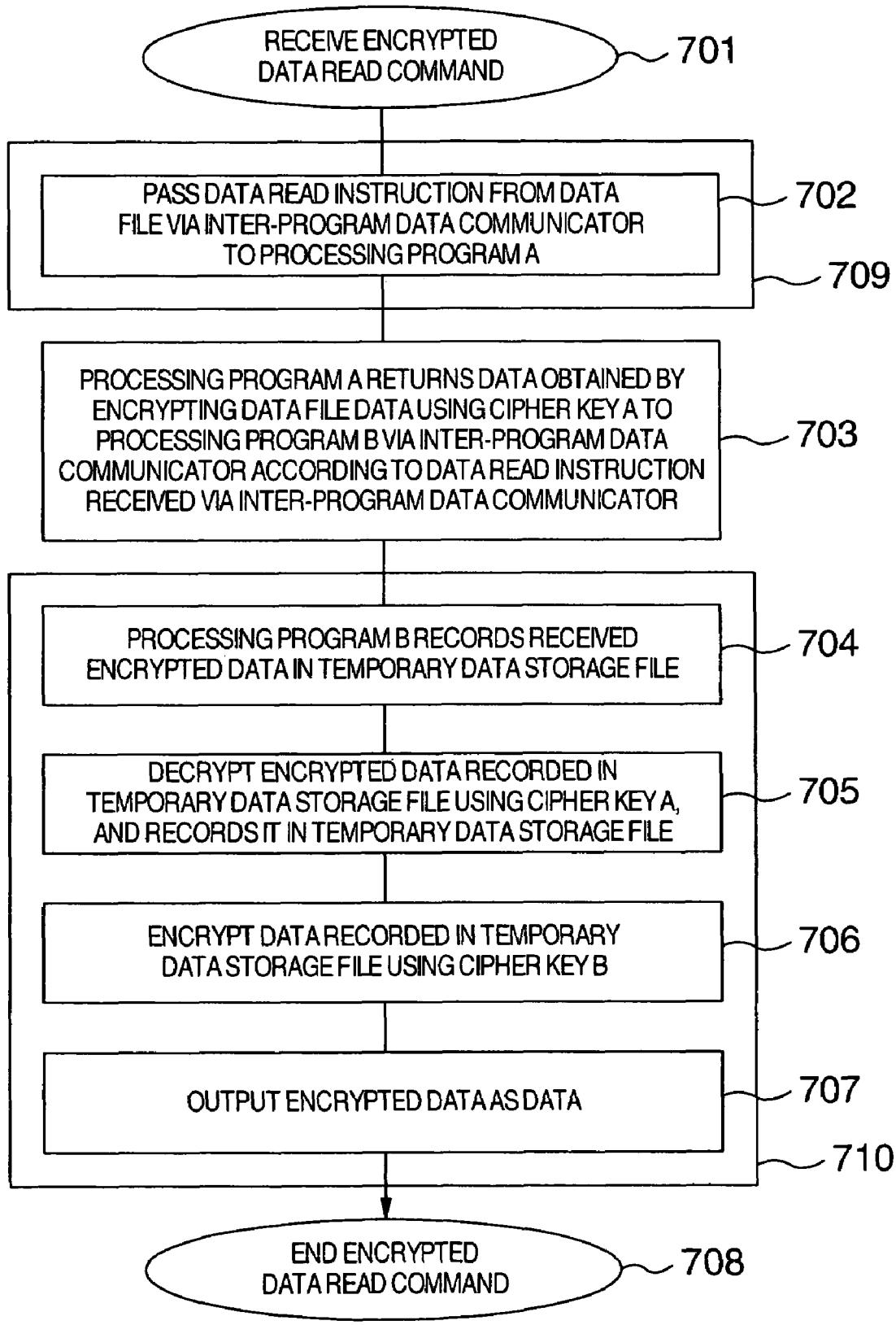

FIG.9A

ENCRYPTED DATA WRITE COMMAND

| CLA | INS | P1 | P2 | Lc | Le |
|-----|-----|----|----|----|----|
| x1  | x2  | x3 | x4 | x5 | x6 |

Lc Data

| TITLE | LENGTH | CONTENTS |
|-------|--------|----------|
| STORAGE DATA | nBytes | ENCRYPTED DATA TO BE STORED | x1:0x82
x2:0x02
x3:0x00
x4:0x00
x5:n=Lc length
x6:0x00= WITHOUT Le

FIG.9B

RESPONSE

WITHOUT Le Data

Status

| SW1 | SW2 |
|-----|-----|
| s1  | s2  | s1:SW1
s2:SW2
SW1=0x90, SW2=0x00 : NORMAL OPERATION

FIG.10A

ENCRYPTED DATA READ COMMAND

| CLA | INS | P1 | P2 | Lc | Le |
|-----|-----|----|----|----|----|
| x1  | x2  | x3 | x4 | x5 | x6 |

WITHOUT Le Data

```
x1:0x82
x2:0x04
x3:0x00
x4:0x00
x5:0x00= WITHOUT Lc
x6:n=Le length
```

FIG.10B

RESPONSE

Le Data

| TITLE | LENGTH | CONTENTS |
|-------|--------|----------|
| READ DATA | nBytes | READ ENCRYPTED DATA |

Status

| SW1 | SW2 |
|-----|-----|
| s1  | s2  |

```
s1:SW1
s2:SW2
SW1=0x90, SW2=0x00 : NORMAL OPERATION
```

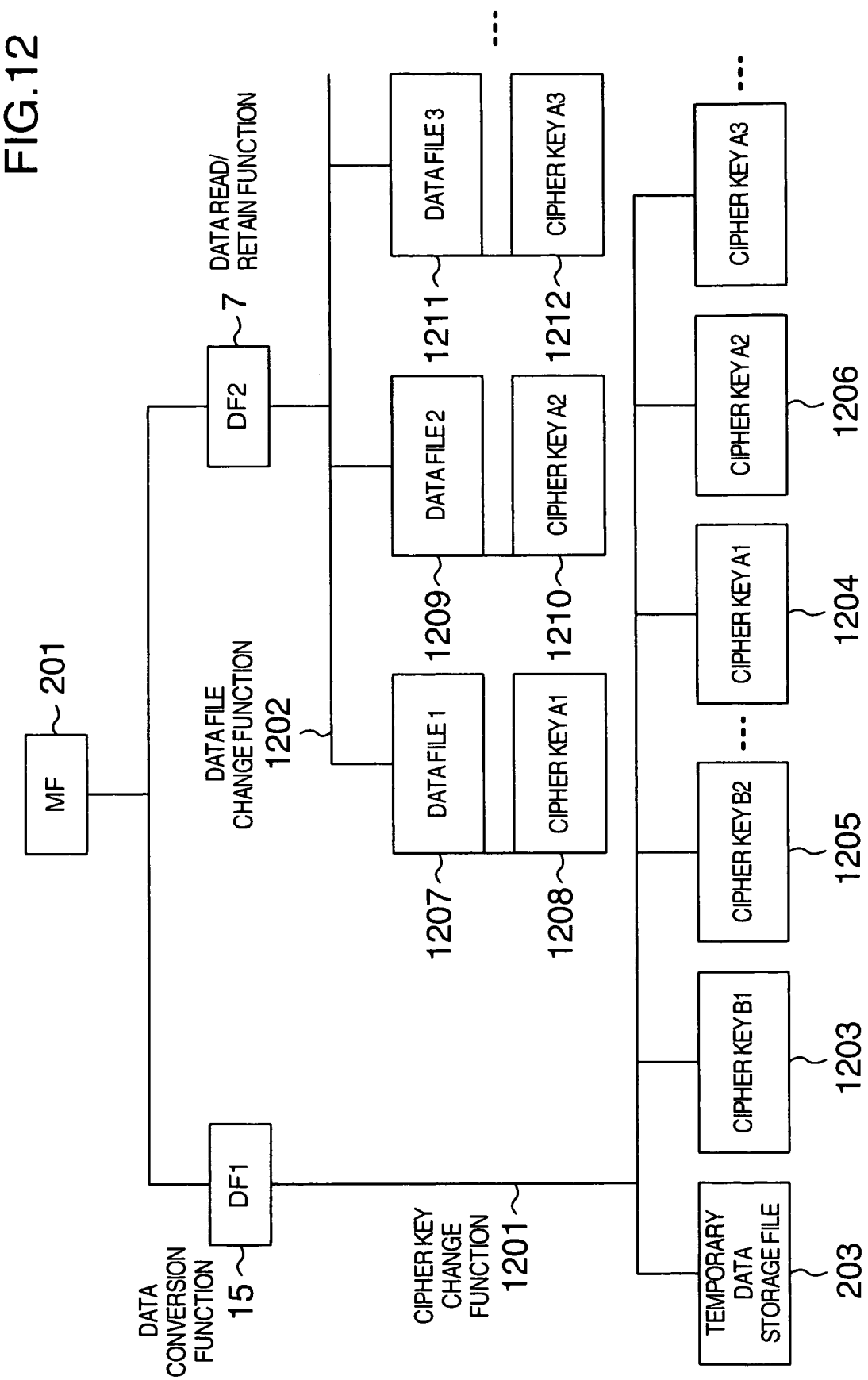

FIG.13A

ENCRYPTED DATA WRITE COMMAND

| CLA | INS | P1 | P2 | Lc | Le |
|-----|-----|----|----|----|----|
| x1  | x2  | x3 | x4 | x5 | x6 | x1:0x82
x2:0x02
x3:0x00
x4:0x00
x5:n+2=Lc length
x6:0x00= WITHOUT Le

Lc Data

| TITLE | LENGTH | CONTENTS |
|-------|--------|----------|
| DECRYPTION KEY | 1Byte | CIPHER KEY NUMBER FOR DECRYPTION |
| STORAGE DESTINATION | 1Byte | FILE NUMBER FOR DATA STORAGE |
| STORAGE DATA | nBytes | ENCRYPTED DATA TO BE STORED |

FIG.13B

RESPONSE

WITHOUT Le Data

Status

| SW1 | SW2 |
|-----|-----|
| s1  | s2  | s1:SW1
s2:SW2
SW1=0x90, SW2=x000 : NORMAL OPERATION

FIG.14A

ENCRYPTED DATA READ COMMAND

| CLA | INS | P1 | P2 | Lc | Le |
|-----|-----|----|----|----|----|
| x1  | x2  | x3 | x4 | x5 | x6 |

Lc Data

| TITLE | LENGTH | CONTENTS |
|-------|--------|----------|
| CIPHER KEY | 1 Byte | CIPHER KEY NUMBER FOR ENCRYPTION |
| READ TARGET | 1 Byte | FILE NUMBER FOR DATA READING | x1:0x82
x2:0x04
x3:0x00
x4:0x00
x5:0x03=Lc length
x6:n=Le length

FIG.14B

RESPONSE

Le Data

| TITLE | LENGTH | CONTENTS |
|-------|--------|----------|
| READ DATA | nBytes | READ ENCRYPTED DATA |

Status

| SW1 | SW2 |
|-----|-----|
| s1  | s2  | s1:SW1
s2:SW2
SW1=0x90, SW2=0x00 : NORMAL OPERATION

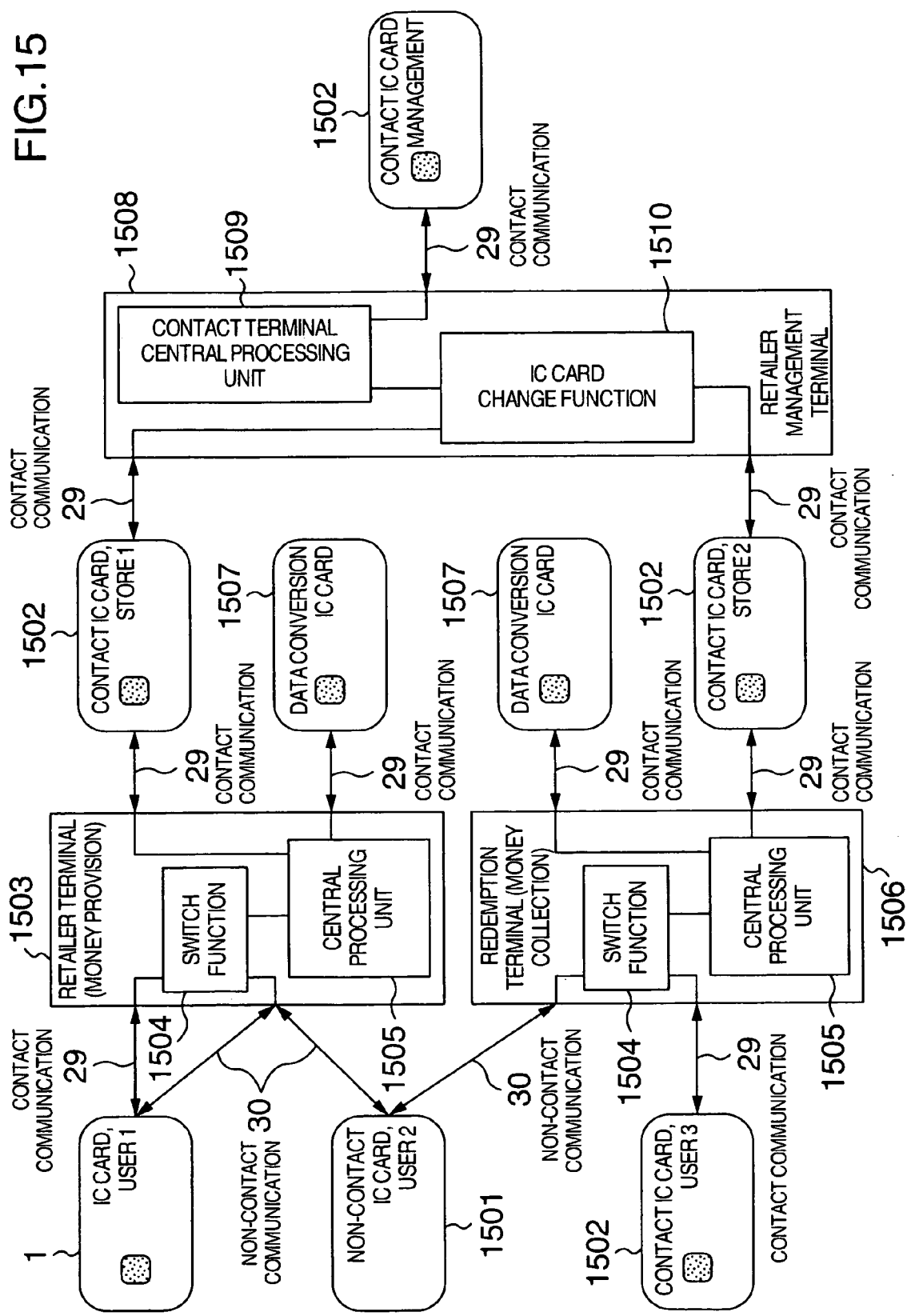

ENCRYPTED DATA CONVERSION COMMAND

| CLA | INS | P1 | P2 | Lc | Le |
|-----|-----|----|----|----|----|
| x1  | x2  | x3 | x4 | x5 | x6 |

Lc Data

| TITLE | LENGTH | CONTENTS |
|-------|--------|----------|
| STORAGE DATA | nBytes | ENCRYPTED DATA TO BE CONVERTED | x1:0x82
x2:0x02
x3:0x00
x4:0x00
x5:n1=Lc length
x6:n2=Le length

RESPONSE
Le Data

| TITLE | LENGTH | CONTENTS |
|-------|--------|----------|
| STORAGE DATA | nBytes | CONVERTED ENCRYPTED DATA |

Status

| SW1 | SW2 |
|-----|-----|
| s1  | s2  | s1:SW1
s2:SW2
SW1=0x90, SW2=0x00 : NORMAL OPERATION

FIG.21A

ENCRYPTED DATA INVERSE-CONVERSION COMMAND

| CLA | INS | P1 | P2 | Lc | Le |
|-----|-----|----|----|----|----|
| x1  | x2  | x3 | x4 | x5 | x6 |

Lc Data

| TITLE | LENGTH | CONTENTS |
|-------|--------|----------|
| READ DATA | nBytes | ENCRYPTED DATA TO BE INVERSELY CONVERTED | x1:0x82
x2:0x04
x3:0x00
x4:0x00
x5:n1=Lc length
x6:n2=Le length

FIG.21B

RESPONSE

Le Data

| TITLE | LENGTH | CONTENTS |
|-------|--------|----------|
| READ DATA | nBytes | INVERSELY-CONVERTED ENCRYPTED DATA |

Status

| SW1 | SW2 |
|-----|-----|
| s1  | s2  | s1:SW1
s2:SW2
SW1=0x90, SW2=0x00 : NORMAL OPERATION

IC CARD WITH A CIPHER KEY CONVERSION FUNCTION

INCORPORATION BY REFERENCE

The present application claims priority from Japanese application JP 2003-141295 filed on May 20, 2003, the content of which is hereby incorporated by reference into this application.

BACKGROUND OF THE INVENTION

The present invention relates to an IC card system in which information is recorded in an IC card.

A related system for recording information in an IC card uses such a technique as disclosed, e.g., in JP-A-2001-167241. In this literature, an object of the invention is to enable reliable retaining of secret information of each application provider when preparing a multi-application non-contact IC card. More specifically, a memory 6 is divided into a plurality of regions 7a to 7d according to the number of applications to be installed, and the division regions 7a to 7d are used as respectively independent memory spaces for the respective applications. Therefore, even when a plurality of applications are installed in a single non-contact IC card, the need for each application provider to disclose his unique secret information to a conventional card issue maker can be eliminated, and security can be assured while preventing important secret information from being leaked to an unauthorized person.

SUMMARY OF THE INVENTION

In the above related technique, with respect to information recorded in an IC card, it has been impossible to read and write secret information of another application provider while keeping information of one application provider secret.

It is therefore an object of the present invention to enable an application provider to refer to, read or change information recorded in an IC card by another application provider.

In an aspect of the present invention, the above object is attained by providing an IC card which includes a memory having first and second cipher keys stored therein, and an operating module which decrypts data encrypted with the first cipher key using the first cipher key and encrypts the decrypted data using the second cipher key.

In accordance with the present invention, an application provider can provide good service in cooperation with other application providers.

BRIEF DESCRIPTION OF THE DRAWINGS

These and other features, objects and advantages of the present invention will become more apparent from the following description when taken in conjunction with the accompanying drawings wherein:

FIGS. 4A and 4B show command response specifications indicative of the operation of the first embodiment of the present invention;

FIG. 5 shows a flow of operations in the first embodiment of the present invention;

FIGS. 6A and 6B show command response specifications indicative of the operation of the first embodiment of the present invention;

FIG. 7 is another flow of operations in the first embodiment of the present invention;

FIGS. 9A and 9B show command response specifications indicative of the operation of the first embodiment of the present invention;

FIGS. 10A and 10B show command response specifications indicative of the operation of a second embodiment of the present invention;

FIG. 12 is a structure of internal files of an IC card in accordance with the second embodiment of the present invention;

FIGS. 13A and 13B show command response specifications indicative of the operation of the second embodiment of the present invention;

FIGS. 14A and 14B show command response specifications indicative of the operation of the second embodiment of the present invention;

FIG. 15 shows a configuration of a system in accordance with a third embodiment of the present invention;

FIGS. 21A and 21B show command response specifications indicative of the operation of the third embodiment of the present invention.

DETAILED DESCRIPTION OF THE EMBODIMENTS

A first embodiment of the present invention will be explained with reference to FIGS. 1 to 10.

Figure 1:
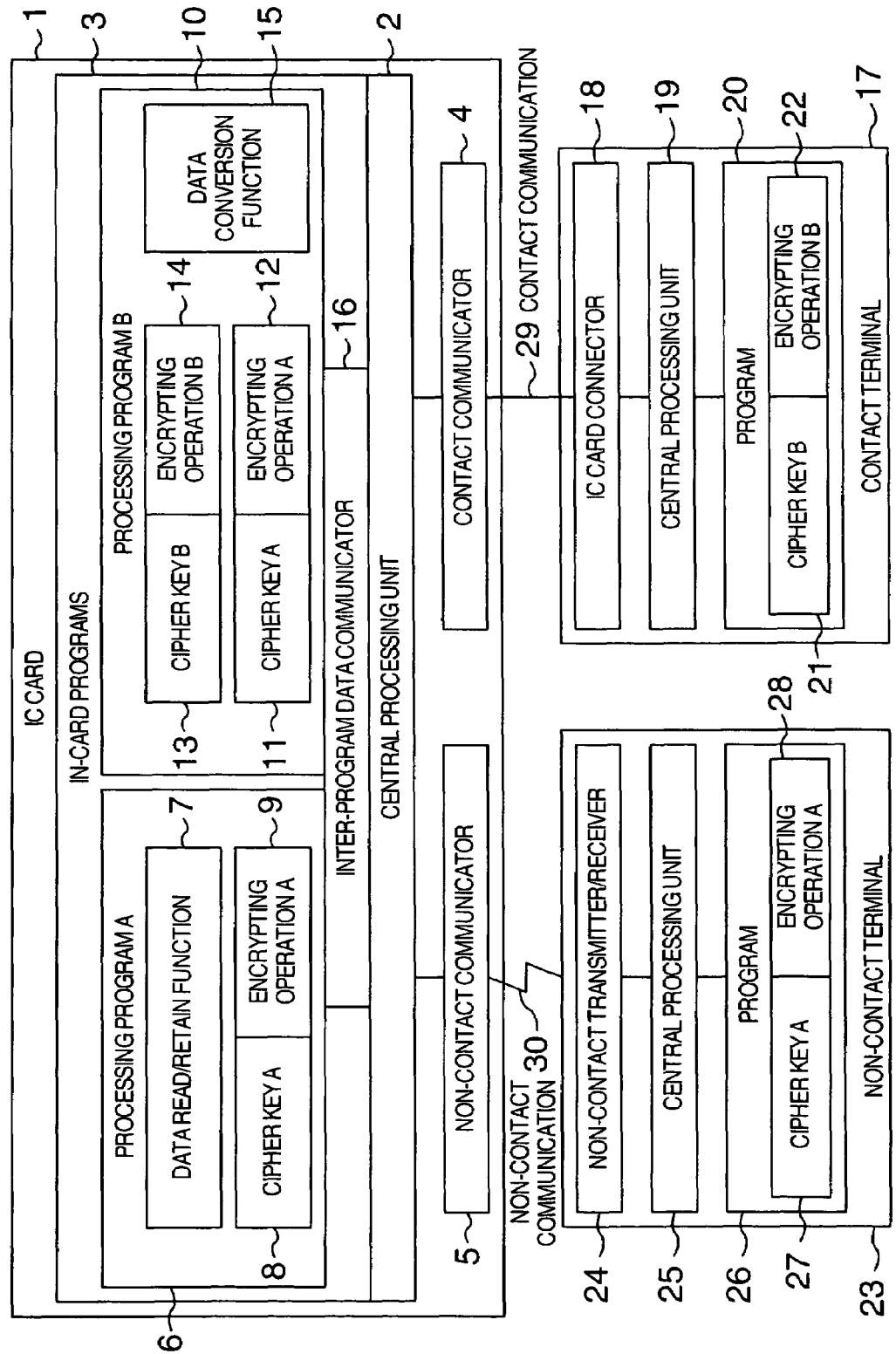
FIG. 1 shows a configuration of a system in accordance with a first embodiment of the present invention.

FIG. 1 shows a configuration of a system in accordance with the first embodiment of the present invention. In the drawing, reference numeral 1 denotes an IC card having a central processing unit 2 therein, numeral 3 denotes programs recorded within the IC card, 4 denotes a contact communicator based on the ISO7816 standard for performing data transfer to and from an external device having the IC card physically connected thereto, and 5 denotes a non-contact communicator based on the ISO14443 standard for performing data transfer to and from an external device connected to the IC card not to be contacted therewith. Further, reference numeral 6 denotes a processing program A as part of in-card programs 3, numeral 7 denotes a data read/retain function as the internal function of the processing program A 6, 8 denotes a cipher key A securely retained within the processing program A 6, and 9 denotes an encrypting operation A using the cipher key A 8 within the processing program A 6. Reference numeral 10 denotes a processing program B different from the processing program A 6 within the in-card programs 3, numeral 11 denotes a cipher key A securely retained within the processing program B 10, 12 denotes an encrypting operation A using the cipher key A 11 within the processing program B 10, 13 denotes a cipher key B securely retained within the processing program B 10, 14 denotes an encrypting operation B using the cipher key B 13 within the processing program B 10, and 15 denotes a data transform or conversion function of performing data conversion using the encrypting operation A 12 and the encrypting operation B 14 as the internal function of the processing program B 10. Reference numeral 16 denotes an inter-program data communicator for performing mutual data transfer between the processing program A 6 and the processing program B 10 while they will not mutually directly refer to or modify the internal program or data.

Reference numeral 17 denotes a contact terminal for communicating with the IC card 1 via the contact communicator 4, numeral 18 denotes an IC card connector electrically connected with the IC card 1 via the contact communicator 4 of the IC card 1, 19 denotes a central processing unit for controlling the contact terminal 17, 20 denotes a contact terminal program describing the control of the contact terminal central processing unit 19, 21 denotes a cipher key B to be used in the contact terminal program 20, and 22 denotes an encrypting operation B using the cipher key B 21 as the internal function of the contact terminal program 20. Reference numeral 23 denotes a non-contact terminal for communicating with the IC card 1 via the non-contact communicator 5, numeral 24 denotes a non-contact transmitter/receiver for transmitting/receiving data via the non-contact communicator 5 of the IC card 1 while not connected with the IC card 1 when viewed as a DC Circuit, 25 denotes a central processing unit for controlling the non-contact terminal 23, 26 denotes a non-contact terminal program describing the control of the non-contact terminal central processing unit 25, 27 denotes a cipher key A to be used in the non-contact terminal program 26, and 28 denotes an encrypting operation A using the encrypting operation A 27 as the internal function of the non-contact terminal program 26. Communication between the IC card 1 and the contact terminal 17 is carried out by contact communication 29, and communication between the IC card 1 and the non-contact terminal 23 is carried out by non-contact communication 30.

Explanation will be made as to the arrangement of the present embodiment by referring to FIG. 2.

Figure 2:
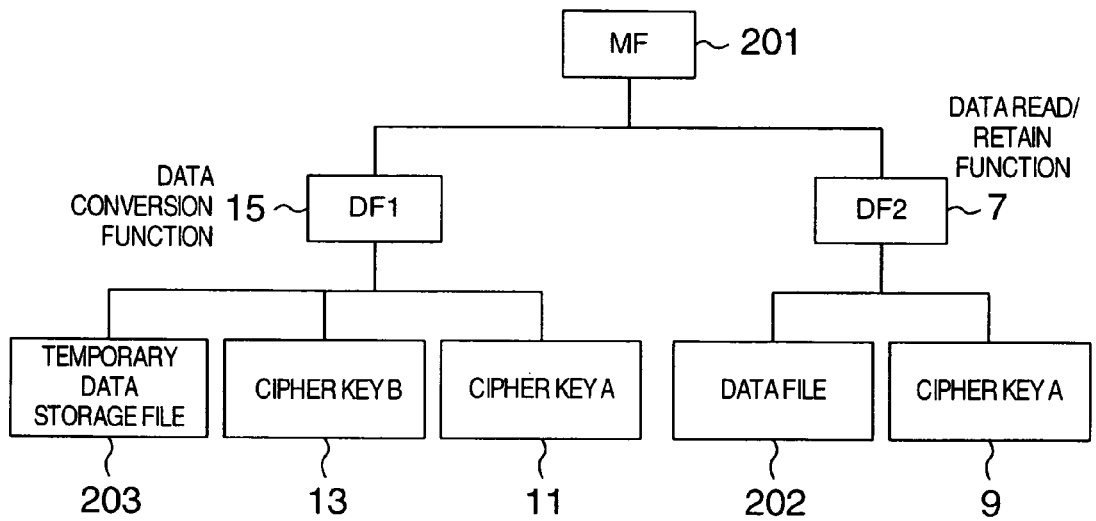
FIG. 2 shows a structure of internal files of an IC card in accordance with the first embodiment of the present invention.

FIG. 2 shows a structure of internal files of the IC card 1 according to the ISO7816 and ISO14443 standards. The file structure of FIG. 2 corresponds to the interior of the IC card 1 of FIG. 1, when the in-card programs 3 are viewed from the contact communicator 4 or the non-contact communicator 5. The operation of the file structure is implemented by the central processing unit 2. In FIG. 2, reference numeral 201 denotes an MF (Master File) as the base of internal files of the IC card 1, and constituent elements having the same functions as those in FIG. 1 are denoted by the same numerals. Reference numeral 202 denotes a data file to be read out or recorded by the data read/retain function 7. Numeral 203 denotes a temporary data storage file to be temporarily used when the data conversion function 15 converts data. These files are put in a non-volatile memory.

Figure 3:
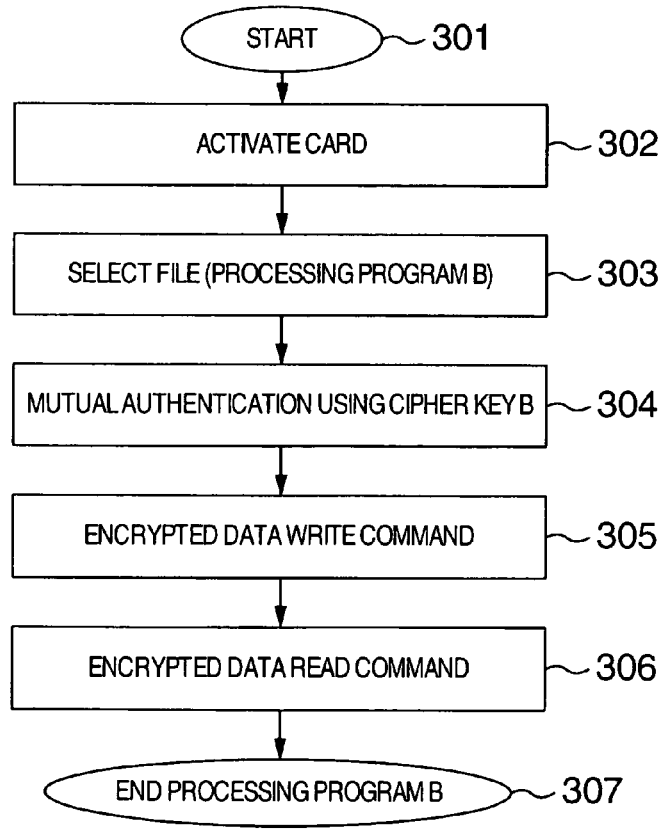
FIG. 3 is a flow of processing operations in the first embodiment of the present invention.

Explanation will be further made as to the arrangement of the present embodiment with use of FIG. 3.

FIG. 3 is a flow of processing operations of the contact terminal program 20 of the contact terminal 17 shown in FIG. 1. When the IC card 1 is connected to the IC card connector 18 and the contact terminal 17 starts its operation with a start step 301, the contact terminal 17 activates the card according to a procedure defined in the ISO7816 standard. The contact terminal 17 reads ATR (Answer To Reset) outputted from the activated IC card 1, and is set to processing conditions according to the ATR. The contact terminal 17 further sets the DF title of the processing program B 10 to the file ID of a Select File command defined in the ISO7816 standard and then transmits it in a step 303 of "select file (processing program B)". The program start function of the IC card 1 causes the operation control of the IC card 1 to be shifted to the processing program B 10, so that the IC card 1 can use the data conversion function 15. In a step 304, the contact terminal 17 performs mutual authentication with the IC card 1 using the cipher key B 21. In a step 305, the contact terminal 17 issues an encrypted data write command to instruct to write the encrypted data. The contact terminal issues an encrypted data read command to read the recorded encrypted data in a step 306. After such a series of operations are completed, the processing program B 10 terminates its operation in a step 307.

The operation of the present invention having the aforementioned arrangement will be explained by referring to FIGS. 4 to 8.

FIG. 4 shows command response specifications indicating the definition of an encrypted data write command to be transmitted and received via the contact communicator 4 of the IC card 1 of the present embodiment shown in FIG. 3. The command is passed to the IC card 1 according to the data format and procedure based on the ISO7816 standard. The IC card 1 when receiving the encrypted data write command performs its operation according to the processing program B 10 at the central processing unit 2, which operation will be explained with use of FIG. 5.

FIG. 5 is a flow of operations of the IC card 1 when receiving the encrypted data write command. In a step 501 of FIG. 5, the IC card receives an encrypted data write command. In a step 502, the IC card decrypts the received storage data using the cipher key B 13 through the encrypting operation B 14 by the data conversion function 15. Storage data decrypted in a step 503 is recorded in the temporary data storage file 203. The temporary data storage file 203 consists of non-volatile memories. Thus, even when the processing of the IC card 1 is interrupted at this time point, the storage data is retained. In a step 504, the encrypted storage data recorded in the temporary data storage file 203 is encrypted through the encrypting operation A 12 using the cipher key A 11. The encrypted storage data is passed to the processing program A 6 via the inter-program data communicator 16 in a step 505. In a step 506, the processing program A 6 decrypts the received encrypted storage data using the data read/retain function 7 and the cipher key A 8 through the encrypting operation A 9, and stores the decrypted data in the data file 202. When the data storage in the data file 202 normally terminates, the processing program A 6 sends a response to the processing program B 10 via the inter-program data communicator 16 to inform the processing program B 10 of the normal termination. In the step 507, the processing program B 10 when receiving the response, outputs the response of the processing program as a status defined in the ISO7816 standard. In a step 508, the IC card 1 terminates its operation through a series of operations after reception of the encrypted data write command. The operations 509 from the step 502 to the step 505 are carried out by the processing program B 10, while the operation 510 of the step 507 is carried out by the processing program B 10.

FIG. 6 shows command response specifications indicating the definition of an encrypted data read command to be transmitted and received to and from the IC card 1 of the present embodiment of FIG. 3 via the contact communicator 4 of the card. The command is passed to the IC card 1 according to the data format and procedure based on the ISO7816 standard. The IC card 1 when receiving the encrypted data read command, performs its operation according to the processing program B 10 at the central processing unit 2. The encrypted data read command is of a type wherein read data is used as its response. This operation will be explained by referring to FIG. 7.

FIG. 7 shows a flow of operations of the IC card 1 when receiving an encrypted data read command. In a step 701 of FIG. 7, the IC card receives an encrypted data read command. In a step 702, the IC card instructs the processing program A 6 via the inter-program data communicator 16 to read encrypted data according to the received read command. In a step 703, the processing program A 6, according to the received read instruction, encrypts data recorded in the data file 202 using the cipher key A 8 by the data read/retain function 7, and sends the encrypted read data as a response to the processing program B 10 via the inter-program data communicator. The processing program B 10 records the read data received via the inter-program data communicator in the temporary data storage file 203 in a step 704. The temporary data storage file 203 consists of the non-volatile memories. Thus, even when the operation of the IC card 1 is interrupted at this time point, the storage data is retained. In a step 705, the processing program B 10 decrypts, through the encrypting operation A 12 using the cipher key A 11, the encrypted read data recorded in the temporary data storage file 203 and encrypted using the cipher key A. The decrypted read data is recorded in the temporary data storage file 203. In the 706, the processing program B 10 again encrypts the decrypted read data recorded in the temporary data storage file 203 through the encrypting operation B 14 using the cipher key B 13. In a step 707, the re-encrypted read data is output as an output specified in the ISO7816 standard together with the status. The IC card 1 terminates its operation in a step 708 through a series of operations after reception of the encrypted data write command. The operation 709 in the step 702 as well as operations 710 from the step 704 to the step 707 are carried out by the processing program B 10.

Figure 8:
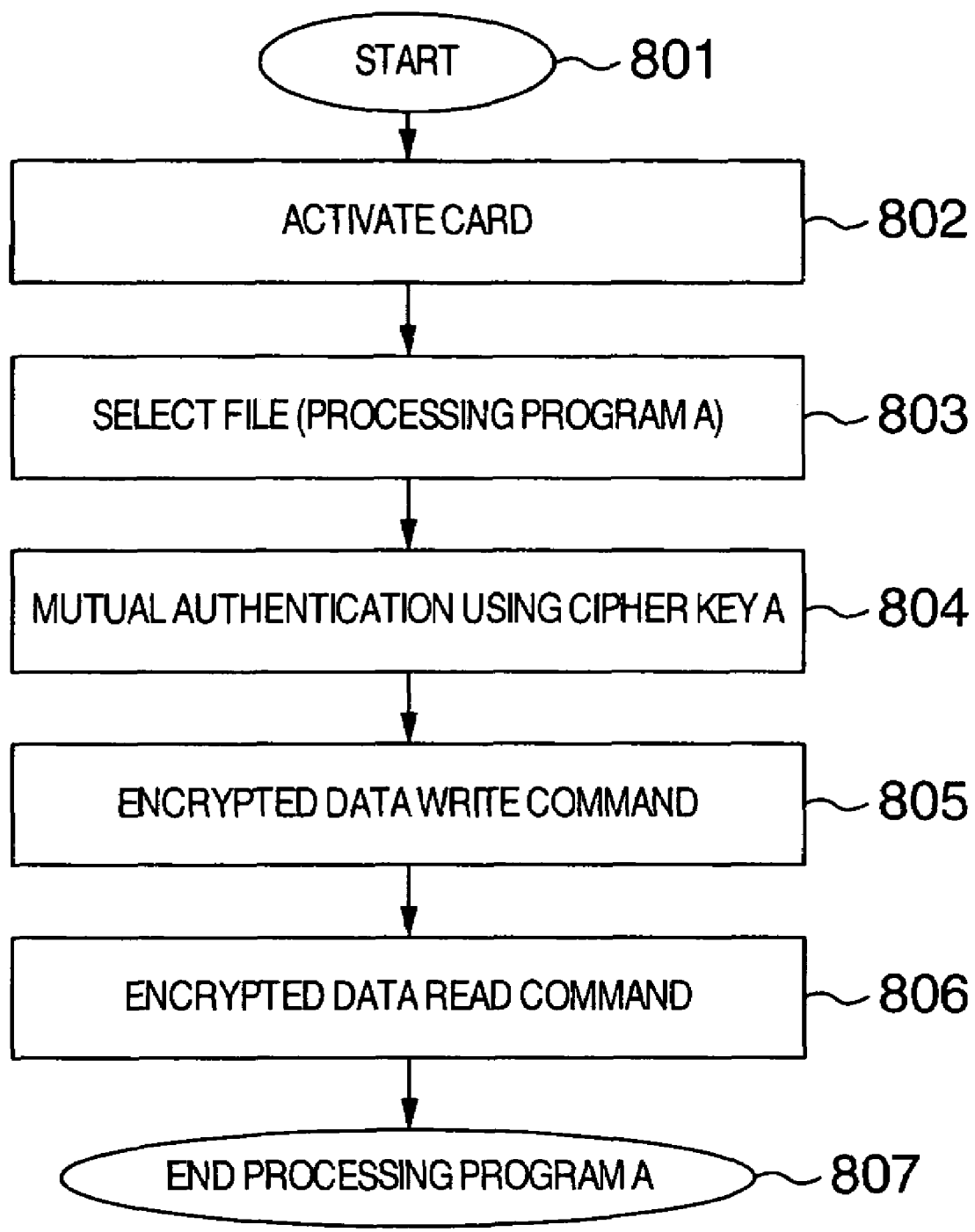
FIG. 8 is a further flow of operations in the first embodiment of the present invention.

FIG. 8 shows a flow of processing operations of the non-contact terminal program 26 of the non-contact terminal 23 shown in FIG. 1. When the IC card 1 is connected to the non-contact transmitter/receiver 24 and the non-contact terminal 23 starts its operation (step 801), the non-contact terminal 23 activates the card according to a procedure defined in the ISO14443 standard (step 802). The non-contact terminal 23, in a step 803 of "select file (processing program A)", sets the DF title of the processing program A 6 to the file ID of the Select File command defined in the ISO7816 standard and transmits it according to the procedure specified in the ISO14443 standard. The program start function causes the operation control of the IC card 1 to be shifted to the processing program A 6, so that the data read/retain function 7 gets ready for its use. In a step 804, the non-contact terminal 23 performs mutual authentication with the IC card 1 using the cipher key A 8. In a step 805, the non-contact terminal issues an encrypted data write command to instruct to write encrypted data. In a step 806, the non-contact terminal issues an encrypted data read command to read the recorded encrypted data. After completion of such a series of operations, the processing program A 6 terminates its operation in a step 807.

FIG. 9 shows command response specifications indicating the definition of an encrypted data write command to be transmitted and received to and from the IC card 1 via the non-contact communicator 5 of the card in the present embodiment of FIG. 8. The command causes a data format conforming to the ISO7816 standard to be passed to the IC card 1 according to the procedure defined in the ISO14443 standard. The non-contact terminal 23 sets encrypted storage data encrypted through the encrypting operation A 28 using the encrypting operation A 28 in the encrypted data write command and transmits the encrypted data. The IC card 1 when receiving the encrypted data write command performs its operation under control of the processing program A 6 in the central processing unit 2 of the IC card 1. The processing program A 6 decrypts by the data read/retain function 7 the input encrypted data through the encrypting operation A 9 using the cipher key A, and stores the decrypted data in the data file 202. When normally completing the normal storage of the data in the data file 202, the processing program A 6 outputs a response to the non-contact terminal to inform the terminal of the normal termination. The operation shown in FIGS. 9A and 9B is substantially the same as the operation of the processing program A 6 shown by the step 506 in FIG. 5, except that data input/output paths are different.

FIGS. 10A and 10B show command response specifications indicating the definition of an encrypted data read command to be transmitted and received to and from the IC card 1 of the present embodiment of FIG. 8 via the non-contact communicator 5 of the card. The command passes a data format conforming to the ISO7816 standard to the IC card 1 according to the procedure defined in the ISO14443 standard. The IC card 1 when accepting the encrypted data read command performs its operation under control of the processing program A 6 in the central processing unit 2 of the card 1. The encrypted data read command is of a type wherein data is used as a response. The processing program A 6 encrypts data recorded in the data file 202 by the data read/retain function 7 using the cipher key A 8, and outputs the read and encrypted data. The operation of FIG. 10 is substantially the same as the operation of the processing program A 6 shown by the step 703 in FIG. 7, except that data input/output paths are different.

The effect of the present embodiment based on the aforementioned operations is as follows.

In the present embodiment, mutual authentication is carried out between the non-contact terminal 23 and IC card 1 and between the contact terminal 17 and IC card 1. Therefore, when the respective terminals and the IC card confirm to be mutually right and then data is read or written, security can be advantageously increased.

In the present embodiment, explanation has been made on the assumption that the cipher key used for the mutual authentication is the same as the cipher key used for the data encryption or decryption. However, even when either one or both of the cipher keys for encryption and decryption may be a temporary cipher key derived from data mutually transacted through the mutual authentication, this will present no problem as a matter of course. Although explanation has been made in the present embodiment in connection with the example wherein the common-key cryptographic scheme is used for both communications between the non-contact terminal 23 and IC card 1 and between the contact terminal 17 and IC card 1, it goes without saying that even when a generally-known public-key cryptographic scheme is used for one of or both of the communications, this will involve no problem. Further, no restriction is imposed even on the method of recording the cipher key. Explanation has been made in the present embodiment on the assumption that the cipher keys are previously recorded in the IC card 1. However, it is also possible to previously record one of the cipher keys in the IC card 1, perform mutual authentication using the recorded cipher key, encrypt and transmit the other cipher key using the other cipher key or using a temporary cipher key derived from a result of data transacted through the mutual authentication, and decrypt and record the data using the cipher key previously recorded in the IC card 1 or using the temporary cipher key. Data to be recorded is recorded in the data file 202. However, as a copy of the recorded data, the data conversion function 15 may uniquely record and retain the converted data in a temporary data storage file to be erased or read out therefrom as necessary.

Explanation will next be made as to a second embodiment of the present invention with reference to FIGS. 11 to 14.

Figure 11:
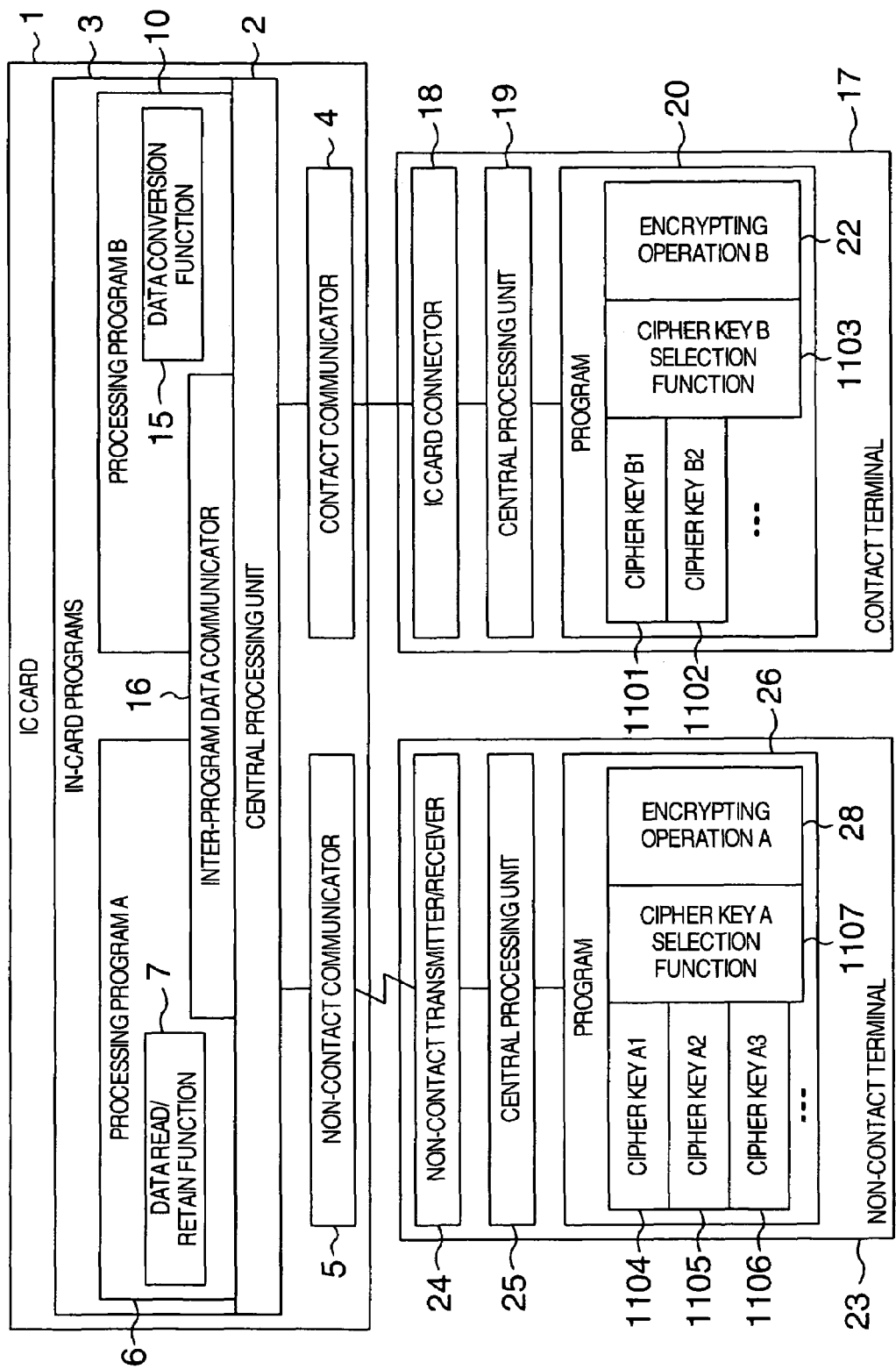
FIG. 11 shows a configuration of a system in accordance with the second embodiment of the present invention.

FIG. 11 shows a configuration of the second embodiment of the present invention, wherein parts having the same functions as those in the first embodiment are denoted by the same reference numerals. The second embodiment is different from the first embodiment in that a cipher key B1 1101 and a cipher key B2 1102 are recorded in the contact terminal 17 as a plurality of cipher keys and a cipher key B selection function 1103 for selecting these cipher keys is provided, in that a cipher key A1 1104, a cipher key A2 1105, and a cipher key A3 1106 are recorded even in the non-contact terminal 23 as a plurality of cipher keys and a cipher key A selection function 1107 for selecting these cipher keys are provided, and in that a function structure (not shown) is provided even to the IC card 1. The function structure applied to the IC card 1 will be explained by referring to FIG. 12.

FIG. 12 shows a structure of internal files of the IC card 1 in accordance with the second embodiment of the present invention, wherein parts having the same functions as those in the first embodiment are denoted by the same reference numerals. The second embodiment is different from the first embodiment in that a cipher key change function 1201 is provided to the data conversion function 15, in that a data file change function 1202 is provided to the data read/retain function 7, in that a cipher key B1 1203, a corresponding cipher key A1 1204, a cipher key B2 1205, and a corresponding cipher key A2 1206 are provided as pluralities of cipher keys B and cipher keys A to be changed by the cipher key change function 1201, and in that a data file 1 1207 and a cipher key A1 1208, a data file 2 1209 and a cipher key A2 1210, and a data file 3 1211 and a cipher key A3 1212 are provided as pairs of a plurality of data files and a plurality of cipher keys A to be changed by the data file change function 1202.

With the aforementioned arrangement, the present invention will be explained.

FIGS. 13A and 13B show command response specifications indicating the definition of an encrypted data write command to be transmitted and received to and from the IC card 1 via the contact communicator 4 of the card in the present embodiment of FIG. 11. The command is passed to the IC card 1 according to a data format and procedure based on the ISO7816 standard. As command data, in addition to the storage data in the first embodiment, a decryption key indicative of the ID of the cipher key B for data decryption as well as a storage destination indicative of the ID of a file as the destination of storage data are added. The contact terminal 17 sets to the encrypted data write command the storage data encrypted through the encrypting operation A 28 using the cipher key B corresponding to the decryption key to be set, sets the corresponding decryption key and storage destination and outputs the command. The IC card 1 when accepting the encrypted data write command performs its operation under control of the processing program B 10 in the central processing unit 2 of the card. The processing program B 10 selects the cipher key B from the retained cipher keys by the cipher key change function 1201. By the data read/retain function 7, the received encrypted data is decrypted through the encrypting operation B 14 using the cipher key B, and stored in the temporary data storage file 203 as decrypted storage data. The cipher key change function 1201 is used to select the cipher key A corresponding to the file ID shown in the storage destination. The decrypted storage data is encrypted through the encrypting operation A 12 using the selected cipher key A. The encrypted storage data is attached with the storage destination of the data file to be stored and then transmitted as data via the inter-program data communicator 16. The processing program A 6 when accepting the encrypted storage data selects the file of the storage destination and the cipher key A to be employed by the data file change function. Thereafter, by the data read/retain function 7, the accepted encrypted storage data is decrypted using the selected cipher key A through the encrypting operation A 9, and then stored in the selected data file. Based on the decryption key and the storage destination attached to the encrypted data write command, the storage file and the cipher key are replaced and the operation is carried out.

FIGS. 14A and 14B show command response specifications indicating the definition of an encrypted data read command to be transmitted and received to and from the IC card 1 via the contact communicator 4 of the card in the present embodiment of FIG. 11. The command is passed to the IC card 1 according to a data format and procedure based on the ISO7816 standard. As command data, in addition to the data in the first embodiment, a cipher key indicative of the ID of the cipher key B for data encryption as well as a read destination shown by the ID of a file in which storage data is to be stored are added. The IC card 1 when receiving the encrypted data read command performs its operation under control of the processing program B 10 in the central processing unit 2 of the card. According to the received command, the IC card instructs the processing program A 6 via the inter-program data communicator 16 to read data. At this time, a read target shown by the file ID identifying the storage storing data to be read is attached to the command. The processing program A 6 selects a data file and a corresponding cipher key A by the data file change function 1202. By the data read/retain function 7, the processing program 6 encrypts data recorded in the selected data file using the corresponding cipher key A, and sends the read encrypted data to the processing program B 10 via the processing program B 10 as the response. The processing program B 10 records the encrypted read data received via the inter-program data communicator in the temporary data storage file 203. By the cipher key change function 1201, the processing program B 10 selects a cipher key A to be used for decryption and a cipher key B to be used for encryption. The processing program B 10 decrypts the encrypted read data recorded in the temporary data storage file 203 through the encrypting operation A 12 using the selected cipher key A. The program records the decrypted read data again in the temporary data storage file 203, and again encrypts it through the encrypting operation B 14 using the selected cipher key B. The re-encrypted read data is output as an output specified in the ISO7816 standard together with a status.

The effects of the present embodiment based on the aforementioned operations will be explained.

In the present embodiment, the cipher key to be used for encryption, the data storage destination, and the cipher key corresponding to the storage file can be selected each from a plurality of the keys or destinations, and be used. For this reason, the cipher key can be advantageously used differently for each file. Further, it goes without saying that no restriction can be imposed in any way on the fact that the key or destination change is used in combination with the mutual authentication explained in the first embodiment, and that the cipher key for use in the encryption and decryption is changed and used.

A third embodiment of the present invention will be explained with reference to FIGS. 15 to 22. In the present embodiment, parts having the same functions as those in the first embodiment are denoted by the same reference numerals.

FIG. 15 shows a configuration of a system in accordance with a third embodiment of the present invention. The third embodiment is different from the first embodiment in that are provided a non-contact IC card 1501 having only a non-contact communicator as a means for communicating with an external device and having only a processing program A 6 as the in-card programs 3; a contact IC card 1502 having only a contact communicator as a means for communicating with an external device and adapted only to the cipher key B for the in-card programs 3; a retailer terminal 1503 and a redemption terminal 1506, each having external contact and non-contact interfaces and also having a switch function 1504 for switching between the external interfaces and a central processing unit 1505 capable of being used for both of the contact and non-contact terminals; an IC card 1507 for data conversion; and a retailer management terminal 1508 adapted to a contact IC card only and having a management contact IC card 1502, an IC card change function 1510 and a contact terminal central processing unit 1509 for controlling and program-processing them.

Figure 16:
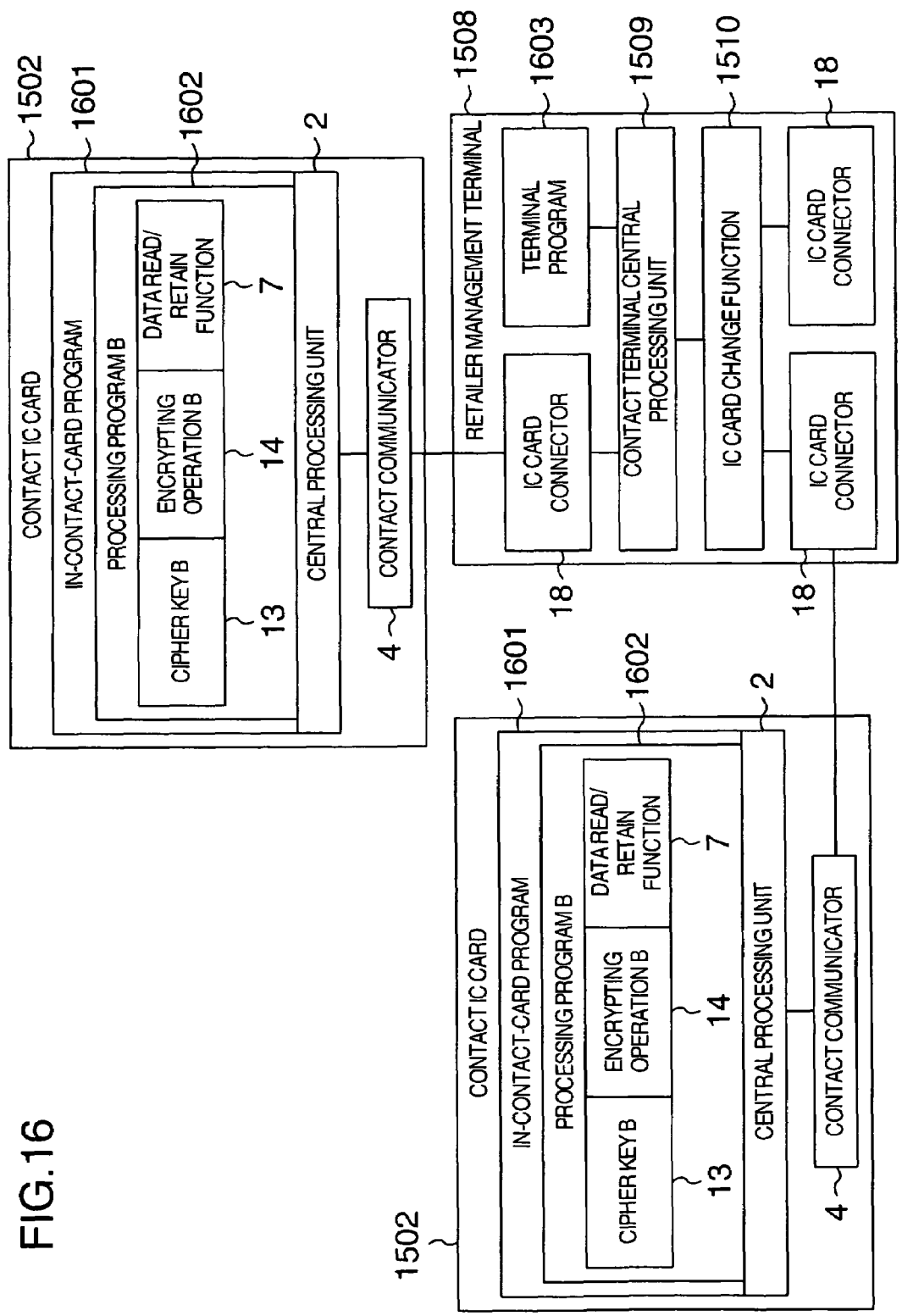
FIG. 16 shows another configuration of a system in accordance with a third embodiment of the present invention.

Explanation will then be made as to the arrangement of the present embodiment with use of FIG. 16. FIG. 16 shows structures of the management IC card 1502 and the retailer management terminals 1508 in the present embodiment. The management IC card 1502 has an in-contact-card program 1601 for exclusive use of contact IC cards. The in-contact-card program 1601 incorporates a processing program 1602 for exclusive use of contact cards. The processing program 1602 has a structure that the data read/retain function 7 of the processing program A 6 uses the cipher key B 13 as in the first embodiment. The retailer management terminal 1508, which has a terminal program 1603 to be operated in the contact terminal central processing unit 1509, is designed so that two of the management IC cards 1502 can be inserted into the terminal. The IC card change function changes between the management IC cards 1502 under control of the contact terminal central processing unit 1509.

Figure 17:
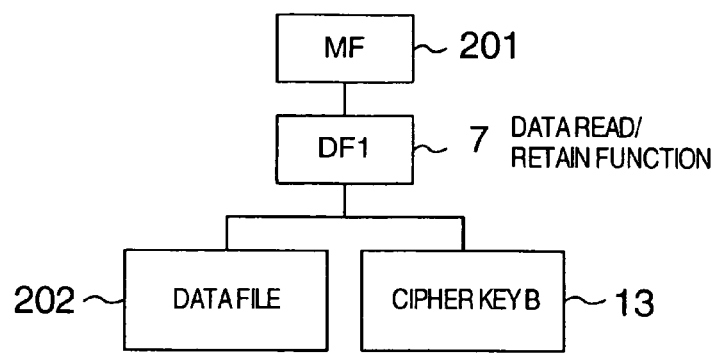
FIG. 17 shows a structure of internal files of an IC card in accordance with the third embodiment of the present invention.

The arrangement of the present embodiment will be further explained by referring to FIG. 17 showing a structure of internal files of the contact IC card 1502 in the present embodiment. Reference numeral 201 denotes an MF as a base of the internal files of the IC card 1, numeral 202 denotes a data file from which or in which data is read out or written by the data read/retain function 7. These files are put in a non-volatile memory.

Figure 18:
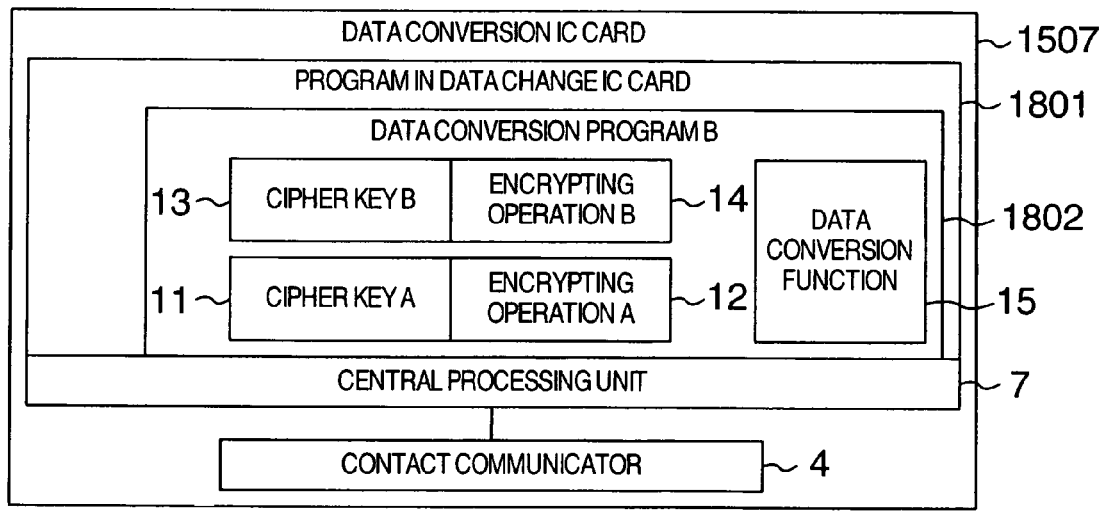
FIG. 18 shows a structure of an IC card in accordance with the third embodiment of the present invention.

Explanation will further be made as to the arrangement of the present embodiment with reference to FIG. 18 showing a structure of the data conversion IC card 1507 in the present embodiment. The data conversion IC card 1507 has an in-card program 1801, which in turn contains a data conversion program 1802. The data conversion program 1802 has such a data conversion function 15 possessed by the processing program,B 10 as in the first embodiment.

Figures 19, 20A, 20B:
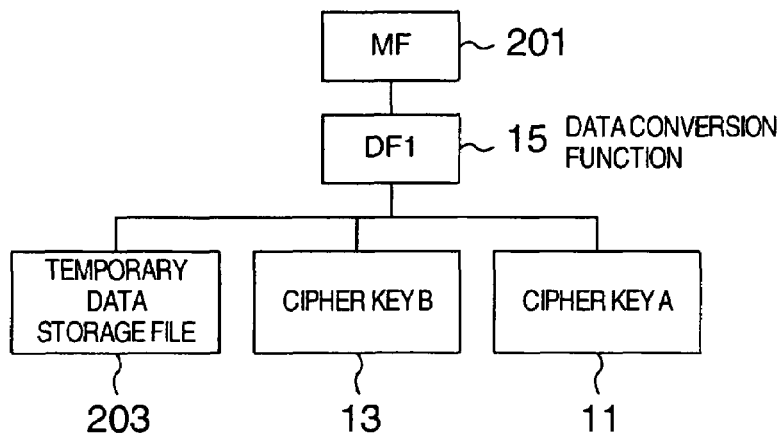
FIG. 19 shows a structure of internal files of the IC card in accordance with the third embodiment of the present invention.
FIGS. 20A and 20B show command response specifications indicative of the operation of the third embodiment of the present invention.

Explanation will further be made as to the arrangement of the present embodiment by referring to FIG. 19 showing a structure of internal files of the data conversion IC card 1507. In the drawing, reference numeral 201 denotes an MF as a base of the internal files of the IC card 1, and numeral 203 denotes a temporary data storage file 203 to be temporarily used when the data conversion function 15 converts data. These files are put in a non-volatile memory.

The operation of the present invention having the aforementioned arrangement will be explained.

In the present embodiment, the management contact IC card 1502 and the retailer contact IC card 1502 are inserted in the retailer management terminal 1508. Mutual authentication between the two contact IC cards 1502 is carried out by activating the inserted IC cards 1502 and inputting the output of one of the cards to the other card. After the mutual authentication is completed, issuance of an encrypted data read command to one of IC cards 1502 causes data recorded in the data file 202 of one IC card 1502 to be encrypted by the cipher key B 13 and be output as encrypted data. When the encrypted output data is input to the other IC card under control of the encrypted data write command, the data saved by the other IC card 1502 in the data file 202 can be securely moved to the other IC card 1502 through the encrypting operation using the cipher key B 13. When data is previously recorded in the data file 202 of one of the IC cards 1502, data movement between the IC cards 1502 can be securely realized. Thus, data can be moved to protect the data against tampering of electronic money or electronic bill. In the present embodiment, an electronic money is previously recorded in the store contact IC card 1502, and the electronic money is moved to the store contact IC card 1502 using the retailer management terminal 1508. Thereafter, the store contact IC card 1502 is removed from the retailer management terminal 1508 and then inserted into the retailer terminal 1503 installed in a store to which the money is to be paid. When the contact IC card 1502 held by the user is inserted into the contact communicator of the retailer terminal 1503, the retailer terminal 1503 moves the electronic money recorded in the data file 202 in the same manner as in the retailer management terminal 1508. When the IC card 1 held by the user is inserted into the contact communicator of the retailer terminal 1503, the retailer terminal 1503 performs its operation similar to the retailer management terminal 1508, whereby the data is recorded in the data file 202 as in the first embodiment. As a result, as in the contact IC card 1502, the electronic money is moved. When a non-contact IC card is inserted, the data conversion IC card 1507 is used.

The operation of the present embodiment will further explained with reference to FIGS. 20A and 20B. Shown in FIGS. 20A and 20B are command response specifications indicating the definition of an encrypted data conversion command to be transmitted and received to and from the data conversion IC card 1507 shown in FIG. 18 via the contact communicator 4 of the card. The command is passed to the data conversion IC card 1507 according to a data format forming to the ISO7816 standard. The data conversion IC card 1507 when receiving the encrypted data conversion command performs its decrypting operation over the received encrypted data to be converted through the encrypting operation B 14 using the cipher key B 13 by the data conversion function 15. The decrypted data to be converted is recorded in the temporary data storage file 203. The temporary storage file 203 consists of non-volatile memories. Thus, even when the operation of the data conversion IC card 1507 is interrupted at this time point, the data to be converted is retained. The data recorded in the temporary data storage file 203 is encrypted through the encrypting operation A 12 using the cipher key A 11. The encrypted and converted data is output as the converted encrypted data together with a status specified in the ISO7816 standard.

The operation of the present embodiment will be further explained with reference to FIGS. 21A and 21B. Shown in FIGS. 21A and 21B are command response specifications indicating the definition of an encrypted data inverse conversion command to be transmitted and received to and from the data conversion IC card 1507 via the contact communicator 4 of the card shown in FIG. 18. The command is passed to the data conversion IC card 1507 according to a procedure conforming to the ISO7816 standard. The data conversion IC card 1507 when receiving the encrypted-data inverse-conversion command performs its decrypting operation over the received encrypted data using the cipher key A 11 through the encrypting operation A 12 of the data conversion function 15. The decrypted data is recorded in the temporary data storage file 203. The temporary data storage file 203 consists of non-volatile memories, so that, even when the operation of the data conversion IC card 1507 is interrupted at this time point, the data to be inversely converted will be saved. The data recorded in the temporary data storage file 203 is encrypted through the encrypting operation B 14 using the cipher key B 13. The encrypted, inverse-converted data is output as data together with a status specified in the ISO7816 standard.

Figure 22:
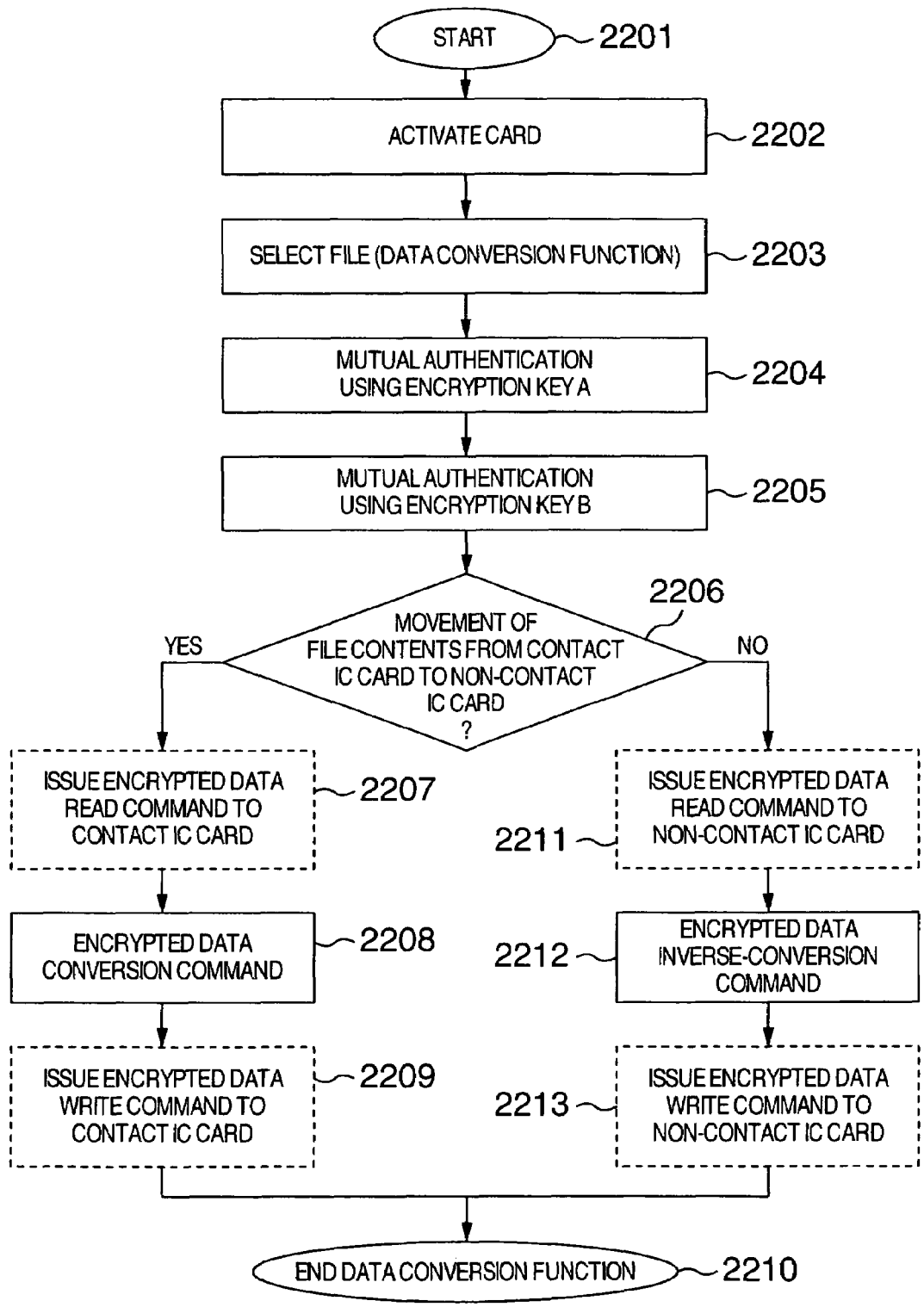
FIG. 22 is a flow of operations in the third embodiment of the present invention.

The operation of the present embodiment will be further explained by referring to FIG. 22. Shown in FIG. 22 is a flow of processing operations of the retailer terminal 1503 and the redemption terminal 1506 in FIG. 15 with respect to the data conversion IC card 1507. When the retailer terminal 1503 and the redemption terminal 1506 start their operation in a step 2201, the retailer terminal 1503 and the redemption terminal 1506 activate the card according to a procedure defined in the ISO7816 standard. The retailer terminal 1503 and the redemption terminal 1506 read ATR (Answer To Reset) outputted from the activated IC card 1, and the terminals are set to processing conditions conforming to the ATR. The retailer terminal 1503 and the redemption terminal 1506 set the DF title of the data conversion program 1802 in the file ID of the Select File (data conversion function) command defined in the ISO7816 standard in a step 2203 of "select file (data conversion function)", and transmit the command. In the IC card 1, the program start function causes the operation control of the IC card 1 to be shifted to the data conversion program 1802, so that the data conversion function 15 can be used. In a step 2204, the retailer terminal 1503 and the redemption terminal 1506 perform mutual authentication with the IC card 1 connected thereto on a non-contact basis or the non-contact IC card 1501, and with the data conversion IC card 1507 using the cipher key A 11. In a step 2205, the retailer terminal 1503 and redemption terminal 1506 perform mutual authentication with the contact IC card 1502 connected thereto on a contact basis and with the data conversion IC card 1507 using the cipher key B 13. In a step 2206, it is judged whether or not the contents of the data file 202 is moved from the contact IC card 1502 to be processed by the retailer terminal 1503 to the non-contact IC card 1501 or to the IC card 1 being connected by the non-contact communication 30.

When the contents of the data file 202 is moved from the contact IC card 1502 to the non-contact IC card 1501 or to the IC card 1 being connected by the non-contact communication 30, the encrypted data read command is issued to the contact IC card 1502 in a step 2207. In a step 2208, the read encrypted data is set in the encrypted data of the encrypted data conversion command to be converted, and then input to the data conversion IC card 1507. The converted encrypted data acquired as a response from the data conversion IC card 1507 is input to the non-contact IC card 1501 or to the IC card 1 being connected by the non-contact communication 30 together with the encrypted data write command in a step 2209. The non-contact IC card 1501 or the IC card 1 being connected by the non-contact communication 30 writes the encrypted input data in the data file 202 in a manner similar to in the first embodiment. In a step 2210, the operations using the data conversion IC card 1507 have been completed.

Meanwhile, when the judgment is NO in the step 2206, control goes to a step 2211, in which an encrypted data read command is issued to the non-contact IC card 1501 or to the IC card 1 being connected by the non-contact communication 30. In a step 2212, the read encrypted data is set in the encrypted data to be inversely converted by the encrypted-data inverse-conversion command, and then is input to the data conversion IC card 1507. In a step 2213, the inverse-converted encrypted data acquired as a response from the data conversion IC card 1507 is input to the contact IC card 1502 or to the IC card 1 being connected by the contact communication 29 together with the encrypted data write command. The contact IC card 1502 or the IC card 1 being connected by the contact communication 29 writes the input encrypted data in the data file 202 as in the first embodiment. In a step 2210, the operations using the data conversion IC card 1507 have been completed.

The operations of the steps 2207, 2209, 2211 and 2213 are for other than the data conversion IC card 1507, but are explained especially for good understanding of the explanation.

The effects of the present embodiment caused by the aforementioned operations are as follows.

In the present embodiment, an IC card cab advantageously be used with the same mechanism as a card having two types of cipher keys. The IC card is featured in that the internal data of the card cannot be read out so easily. That is, since all the cipher keys are recorded in the IC card, the cipher keys cannot be easily read out to advantage.

While we have shown and described several embodiments in accordance with our invention, it should be understood that disclosed embodiments are susceptible of changes and modifications without departing from the scope of the invention. Therefor, we do not intend to be bound by the details shown and described herein but intend to cover all such changes and modifications a fall within the ambit of the appended claims.

What is claimed is:

1. An IC card comprising:
    a communication module which performs data communication with an external device;
    a memory which stores first and second programs, the first program having a data storing function and an encryption/decryption function and including a first cipher key, and the second program having a data conversion function and an encryption/decryption function and including the first cipher key and a second cipher key; and
    an operating module which executes the first and second programs,
    wherein the second program operates to receive encrypted data input via the communication module, decrypt the received data using the second cipher key, encrypt the decrypted data using the first cipher key and pass the encrypted data to the first program,
    wherein the first program operates to receive the encrypted data from the second program, and decrypt the encrypted data using the first cipher key to store the decrypted data in the memory.

2. The IC card as set forth in claim 1, wherein electronic money information is recorded in said memory.

3. The IC card as set forth in claim 1,
wherein the second program operates to receive the data read command via the communication module and pass the data read command to the first program,
wherein the first program operates to read data from the memory in response to the data read command received from the second program and encrypt the read data using the first cipher key to pass the encrypted data to the second program, and
wherein the second program operates to decrypt the encrypted data received from the first program using the first cipher key and encrypt the decrypted data using the second cipher key to output the encrypted key via the communication module.

4. An IC card comprising:
a contact communication module which communicates with an external terminal on a contact basis;
a non-contact communication module which communicates with an external device on a non-contact basis;
a memory which stores first and second programs, the first program having a data storing function and an encryption/decryption function, and the second program having a data conversion function and an encryption/decryption function;
a non-volatile memory which stores first and second cipher keys corresponding to the first and second programs, respectively; and
an operating module which executes the first and second programs,
wherein when communicating with an external device using the non-contact communication module or receiving data from the second program, the first program operates to receive encrypted data, decrypt the encrypted data using the first cipher key to store the decrypted data in the non-volatile memory, and
wherein, when communicating with an external device using the contact communication module, the second program operates to receive encrypted data, decrypt the encrypted data using the second cipher key, encrypt the decrypted data using the first cipher key to pass the encrypted data to the first program.

5. An IC card comprising:
a communication module which performs data communication with an external device;
a memory which stores a first program having a data storing function and an encryption/decryption function, and a second program having a data conversion function and an encryption/decryption function, and stores a first cipher key in a first area which the first program can access, the first and second cipher keys in a second area which the second program can access, and an inter-program communication program; and
an operating module which executes the first and second programs and the inter-program communication program,
wherein the second program operates to receive encrypted data via the communication module, decrypt the encrypted data using the second cipher key stored in the second area, and the encrypts the decrypted data using the first cipher key stared in the second area to pass the encrypted data to the first program,
wherein the inter-program communication program operates to move data between the first program and the second program, and
wherein the first program operates to receive the encrypted data, decrypt the decrypted data using the first cipher key stored in the first area to store the decrypted data in the first area of the memory.

6. An IC card comprising;
a communication module which performs data communication with an external device;
a memory which stores first and second programs, the first program having a data storing function and an encryption/decryption function, and the second program having a data conversion function and encryption/decryption function;
a non-volatile memory which stores a plurality of first cipher keys corresponding to the first program, and a plurality of second cipher keys corresponding to the second program; and
an operating module which executes the first end second programs,
wherein the second program operates to decrypt the encrypted data input via the communication means using the one of the plurality of second cipher keys, select one of the plurality of first cipher keys, and encrypt the decrypted data using the selected cipher key to temporarily store the encrypted data, and
wherein the first program operates to decrypt the temporarily stored encrypted data using the selected first cipher key to store the decrypted data in the non-volatile memory.

* * * * *